C. T. Jerome,
Fire Annihilator,
N° 66,498. Patented July 9, 1867.
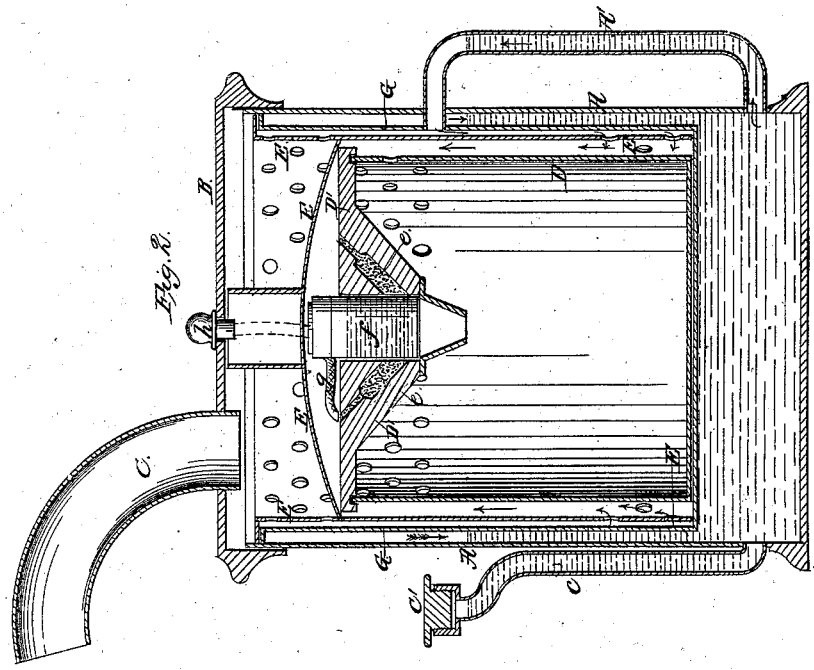
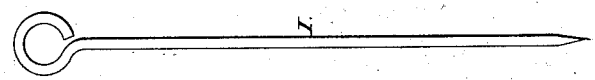
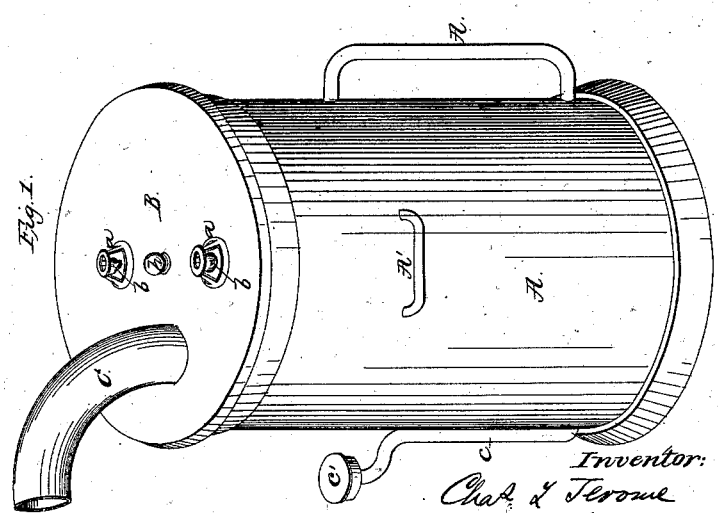
Witnesses:
Inventor:
Chas. T. Jerome
by

United States Patent Office.

CHARLES T. JEROME, OF MINNEAPOLIS, MINNESOTA.

*Letters Patent No. 66,498, dated July 9, 1867.*

IMPROVED FIRE-ANNIHILATOR.

*The Schedule referred to in these Letters Patent and making part of the same.*

TO ALL WHOM IT MAY CONCERN:

Be it known that I, CHARLES T. JEROME, of Minneapolis, in the county of Hennepin, and State of Minnesota, have invented an improved Fire-Annihilator; and I do hereby declare the following to be a full, clear, and exact description thereof, reference being had to the accompanying drawings making part of this specification, in which—

Figure 1 is a perspective view of the exterior of the apparatus.

Figure 2 is a diametrical section, exhibiting the interior construction of the apparatus—

Similar letters of reference indicating corresponding parts in the several figures.

This invention relates to an improved apparatus for, and in a method of, extinguishing fires, by the rapid and copious generation of carbonic acid gas, or other gaseous non-supporter of combustion, in the immediate vicinity of the fire. It consists in combining a fuse, which shall take fire at a low temperature, with an apparatus containing substances which will rapidly generate an anti-combustive gas, and in so arranging the fuse that, when ignited, it will cause said substances in the apparatus to mix or ignite, as the case may be, and thus produce the desired result, as will be hereinafter explained.

To enable others skilled in the art to understand my invention, I will describe one mode of carrying it into effect.

In the accompanying drawings A represents a strong cylindrical vessel, which may be made of any desired capacity, and which is provided with a tightly-fitting cover, B, from which projects a pipe, C, as shown in figs. 1 and 2. This vessel is constructed with double side and bottom walls, formed by the outer wall A and interior wall G, which leaves a surrounding chamber for containing water, as shown in fig. 2. From a point near the bottom of the water-chamber a pipe, c, projects, extending upwards a suitable distance, and receiving upon its cup-shaped end a screw-plug, $c'$. Diametrically opposite the pipe c another pipe, A', is applied to the vessel A, outside thereof, which pipe forms a communication between the water-chamber and the interior of the vessel G, so that when the air above the water in the water-chamber is expanded by heat generated in vessel G, more or less of the water will be forced upward through pipe A into this vessel, for a purpose which will be hereinafter explained. Within the vessel G is a cylinder, E, which is perforated at and near its upper and lower ends, and constructed with a cap or diaphragm, E, near its upper end, through the centre of which is a small hole, surrounded by a cylinder, that extends up to the cover B. Within the cylinder E E is a vessel, D, which is open at top, and which has a bridge-plate, D', supported upon its upper edge, and suitably held in place thereon. This bridge-bar, D', is constructed with a central chamber for receiving a glass cup, $f$, and also with two inclined chambers, $e\ e$, communicating with the cup-chamber for containing gunpowder, or other substance which will answer the same purpose. Three holes are made through the cover B of the vessel A, two of which have open cages or guards $a\ a$ covering them, while the other is adapted for receiving a plug, $h$, which is directly over the central hole, through the diaphragm E, and also over the centre of the glass cup $f$, in the bridge-plate D', as shown in fig. 2.

The apparatus is charged by introducing a substance into the vessel D, consisting of, refined saltpetre one hundred parts, charcoal eighteen parts, sulphur sixteen parts, whiting thirty-three and a half parts, which are finely powdered and thoroughly mixed. Instead of this compound, any other substance or compound may be employed which will give off carbonic acid gas, or any other gaseous non-supporter of combustion. I then charge the chambers $e\ e$ with gunpowder, or some other explosive compound, and introduce sulphuric acid into the glass vial $f$, which vial is then corked, as shown in fig. 2. Water being introduced into the water-chamber, between the inner vessel G and outer vessel A, the apparatus is ready for receiving the fuses. The fuses, or quick-matches, consist of a string powder-fuse, $g$, tipped with a composition which will ignite at a low temperature. This substance may consist of the following ingredients: For the first coating, chlorate of potassa twenty-eight and a half parts, loaf sugar ten parts, well powdered and mixed with an equal bulk of shellac and alcohol; for the second coating, glue ten parts, phosphorus fifteen parts, chlorate of potassa ten parts, whiting three parts, water, a sufficient quantity to make a stiff paste; for the third coating, paraffine eight parts, lard six parts. The matches or fuses thus prepared are passed down through the holes, through the corer B, and their prepared tips $b$ drawn within the guards $a\ a$, as shown in fig. 1, so that these guards will protect them from injury. The lower ends of the fuses are then arranged over or in the vent-holes of the powder-chambers e e, and the apparatus arranged in a suitable position for use. Should a fire occur in an apartment with the above-described apparatus in it, and the temperature be raised to about 112° Fahrenheit, the fatty matter covering the inflammable tips on the fuses will be melted, and said substance exposed to the heat and air, which will ignite it, and thus communicate fire to the powder in chambers e e; the explosion thus produced will shatter the glass vial f, and precipitate the acid therein upon the compound in the vessel D. As considerable heat will be generated by the chemical action in the vessel D, it is desirable to reduce the temperature as much as possible, for which purpose the heat will rarefy the air above the water in the external chamber, and thus cause water to flow into the passage between the walls G and E. If at any time it be desired to produce the gas without having the fuses to operate, the pointed wire-rod I may be forcibly plunged through the hole covered by plug h into the glass vial f, thus effecting the precipitation or mixing of the acid with the carbonaceous substance below.

I do not desire to confine my invention to the precise form of apparatus herein described, as other forms might be adopted which would answer the same purpose. Nor do I confine myself to the within-described ingredients used in the manufacture of the matches, and in producing a gaseous non-supporter of combustion.

I am aware that quick-matches, which would take fire spontaneously at a low temperature, have been employed, in conjunction with alarms, in such manner as to sound an alarm upon the breaking out of a fire in a building; and, therefore, I do not claim this feature as my invention, although it might be adopted in connection therewith.

What I claim as new, and desire to secure by Letters Patent, is—

1. The application of a quick-match, which will take fire at a low temperature, to an apparatus for extinguishing fires by the injection upon the same of a gaseous non-supporter of combustion, substantially as described.

2 Providing the gas-generating vessel D with a water-chamber, substantially as described.

CHAS. T. JEROME.

Witnesses:
    HENRY W. COWLES,
    F. BEEBE.